Oct. 23, 1945.    B. F. SCHMIDT    2,387,411
NIBBLER ATTACHMENT FOR POWER MACHINES
Filed Dec. 19, 1944    3 Sheets-Sheet 1
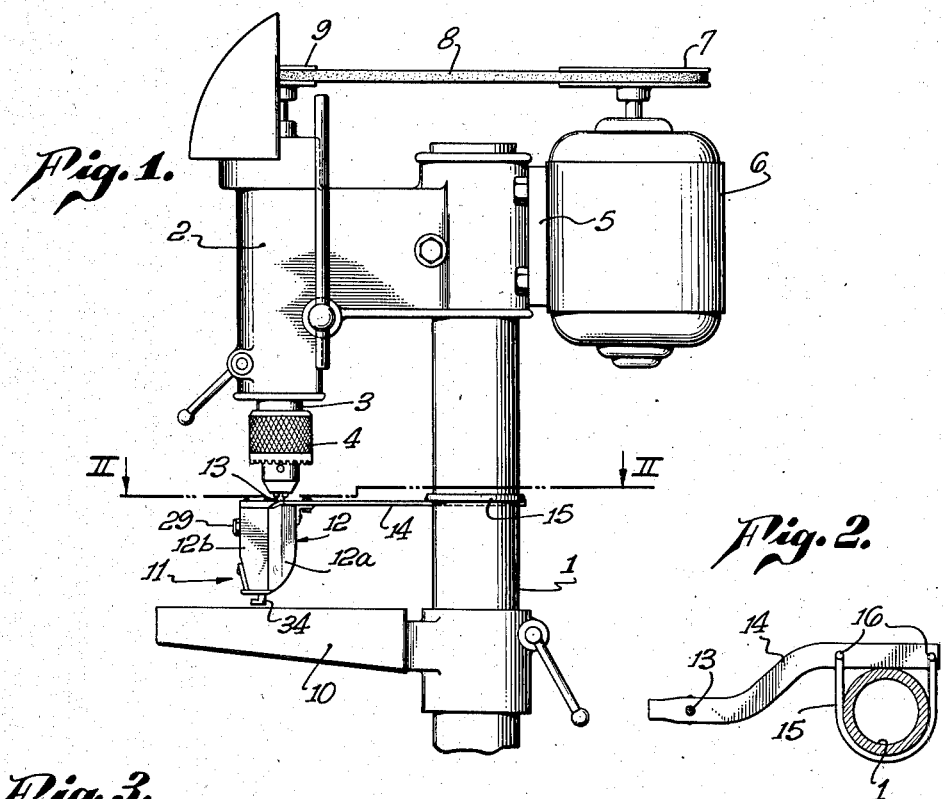
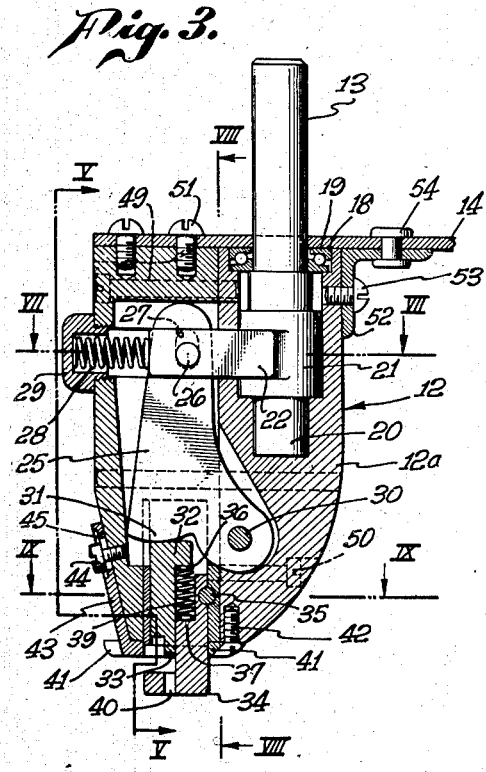
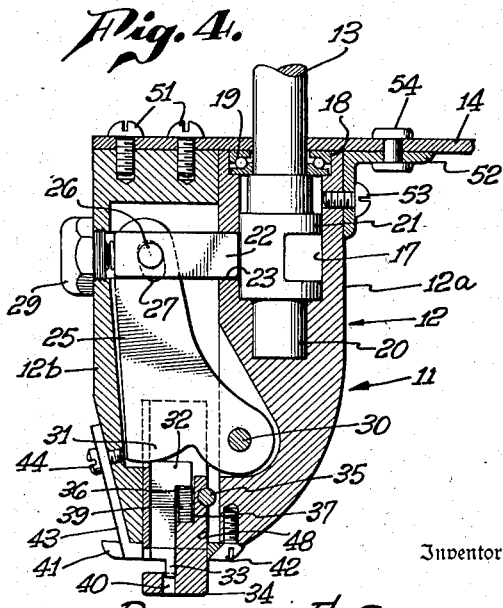
Inventor
By BENJAMIN F. SCHMIDT,
Attorney Oct. 23, 1945. B. F. SCHMIDT 2,387,411
NIBBLER ATTACHMENT FOR POWER MACHINES
Filed Dec. 19, 1944  3 Sheets-Sheet 2

Inventor
BENJAMIN F. SCHMIDT,
By
Attorney

Oct. 23, 1945.  B. F. SCHMIDT  2,387,411
NIBBLER ATTACHMENT FOR POWER MACHINES
Filed Dec. 19, 1944  3 Sheets-Sheet 3

INVENTOR.
BENJAMIN F. SCHMIDT,
BY
ATTORNEY.

Patented Oct. 23, 1945

2,387,411

UNITED STATES PATENT OFFICE 2,387,411

NIBBLER ATTACHMENT FOR POWER MACHINES

Benjamin F. Schmidt, Los Angeles, Calif.

Application December 19, 1944, Serial No. 568,877

3 Claims. (Cl. 164—47)

My invention relates to sheet metal cutting machinery and has particular reference to a cutting machine of the type known as a "nibbler," particularly adapted to be employed as an attachment for drill presses or other power tools in which power is supplied to a rotating shaft.

Metal cutting machines of the type known as nibblers, in which a cutter or die is reciprocated relative to a die plate for the purpose of cutting a series of small bits of metal from a piece of sheet metal to produce a line of cut of any desired shape, are in relatively common use in factories fabricating articles from sheet metal. These machines, however, require considerable floor space in the shop which might more readily be occupied by other metal fabricating machines and, in addition, require a considerable investment due to the fact that these machines are in most instances constructed as a complete unit separate from any other machine in the shop and include a base, work table and power driven apparatus for actuating the reciprocating cutters.

It is therefore an object of my invention to provide a metal cutting machine of the nibbler type which may be constructed as an attachment for existing power actuated machines, such as drill presses, power driven hand drills, or other power driven machine which employs a power actuated rotating shaft.

Another object of my invention is to provide a nibbling machine of the character described wherein the attachment may be formed as a relatively small unit attachable to the drill press or other power driven machine through the medium of the ordinary chuck employed upon the machine with which it is to be associated.

It is another object of my invention to provide a device of the character set forth wherein the nibbler attachment may be constructed as a unit within a suitable housing and in which the power for reciprocating the cutter is supplied through a shaft projecting from the housing to be received in and engaged by the chuck of a drill press or similar driven machine.

Another object of my invention is to provide a nibbler attachment of the character described which may be readily attached to or disconnected from existing power machines in a shop by providing an operating shaft for the nibbler attachment to be engaged by the chuck of the drill press or other power driven machine in the shop and by providing an arm which may be readily connected to some stationary part of the drill press or other power machine to hold the housing of the nibbler attachment against rotation as the shaft of the nibbler attachment is rotated.

Other objects and advantages of my invention will be apparent from a study of the following specifications, read in connection with the accompanying drawings, wherein:

Fig. 1 is an elevational view of a portion of a drill press and illustrating the manner in which my nibbler attachment may be associated therewith;

Fig. 2 is a horizontal sectional view taken along the line II—II of Fig. 1;

Fig. 3 is an enlarged vertical sectional view of the nibbler attachment shown in Fig. 1 and illustrating the position of the parts when the cutter is retracted from the die;

Fig. 4 is a view similar to Fig. 3 but illustrating the position of the parts when the cutter is in its projected position relative to its die;

Figure 5:
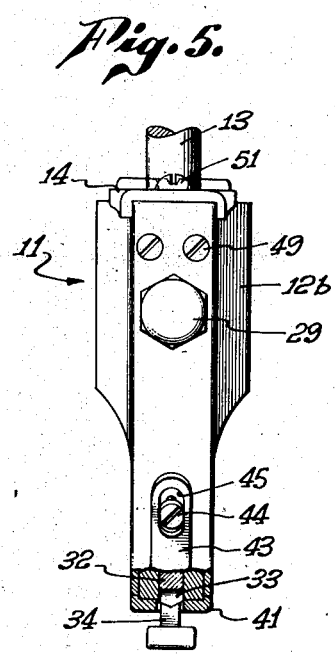
Fig. 5 is an enlarged front elevational view of the nibbler attachment shown in Fig. 1, the lower portion of certain of the parts being broken away to illustrate in section the assembly of the cutter and die, the section being taken along the line V—V of Fig. 3.
Figure 6:
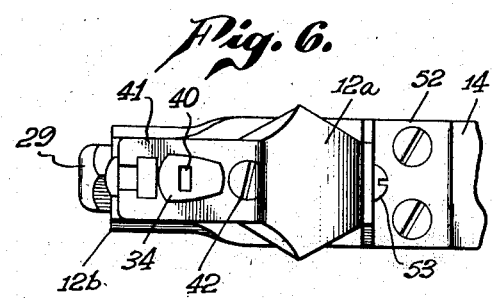
Fig. 6 is a bottom plan view of the nibbler attachment shown in Figs. 1 through 5.

Referring to the drawings, I have illustrated in Fig. 1 a conventional type of drill press which comprises a vertically extending upright post 1, the lower end of which is secured to a suitable base (not shown) while upon the upper end of which is secured a spindle housing 2 in which is rotatably mounted a vertically extending spindle 3 having upon its lower end a drill-holding chuck 4, the particular type of drill press illustrated including a motor mounting block or plate 5, upon which is mounted an electric motor 6 for providing power for rotating the spindle, the motor being provided with a pulley 7 connected by means of a belt 8 to a spindle pulley 9 secured upon the upper end of the spindle 3. Such drill press usually also comprises a work-supporting table 10 adapted to be adjusted vertically relative to the spindle 2 along the upright post 1.

In Fig. 1 I have illustrated my nibbler attachment as being indicated generally by the reference character 11 comprising a suitable housing 12 from which extends a shaft 13 to be received and gripped by the drill chuck 4, the housing 12 having secured thereto a horizontally extending arm or bar 14 adapted to extend past the upright post 1 of the drill press to engage the same where it may be held in place by means of any suitable fastening, such as a length of flexible material 15 adapted to be detachably secured to the bar 14 as indicated at 16. The arm 14 illustrated in Figs. 1 and 2 preferably extends along the left-hand side of the upright post 1 when the drill press is viewed from the front so as to engage against the post to resist the right-hand turning movement imparted to the shaft 13.

For convenience in manufacture, I have illustrated the housing as being formed of two separate elements 12a and 12b, the element 12a having a longitudinal bore 17 extending from its upper end, being enlarged as indicated at 18 for the reception therein of a combination of thrust and roller bearing 19 in which the rotatable shaft 13 is mounted, while the lower end of the bore 17 is of reduced diameter as indicated at 20 for the purpose of receiving a reduced diameter portion of the shaft 13 and acts as a bearing therefor.

Intermediate the thrust bearing 19 and the bearing bore portion 20, a cam 21 is formed upon the shaft 13 for the purpose of producing a horizontal reciprocatory motion upon a thrust arm 22 as the shaft 13 is rotated.

Figure 7:
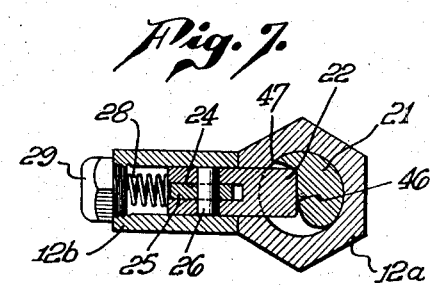
Fig. 7 is a horizontal sectional view taken along the line VII—VII of Fig. 3.
Figure 8:
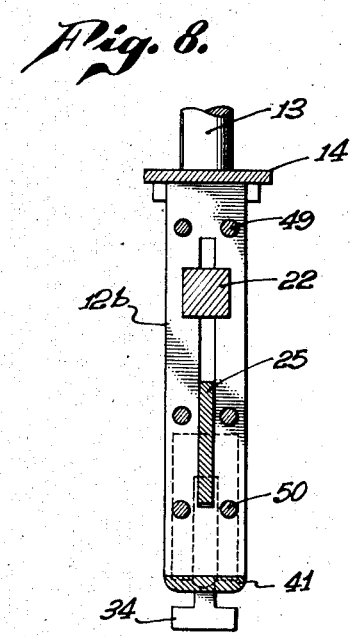
Fig. 8 is a vertical sectional view taken along the line VIII—VIII of Fig. 3.

The thrust arm 22 is illustrated as a substantially rectangular block of metal extending through and bearing upon a rectangular opening 23 in the forward wall of the housing section 12a, the left-hand end of the block 22 being bifurcated as indicated at 24 (Fig. 7) for the purpose of receiving the upper end of a crank arm 25 therein, the block 22 having a transverse bore through which extends a pin 26 by which the block 22 and the crank arm 25 are interconnected, the crank arm 25 being provided with a longitudinally elongated opening 27 adapting the pin 26 to move upwardly and downwardly with respect to the block 22 as the block 22 is reciprocated in the horizontal direction. The block 22 is normally urged toward the left, as indicated in Figs. 3 and 7, as by means of a relatively strong-biasing spring 28 which bears against the end of the block 22 at one end and against a cap screw 29 at its opposite end, which is in turn threaded into the forward or outer wall of the housing section 12b.

The crank arm 25 is illustrated as being pivoted as at 30 upon the housing section 12a and having a forwardly extending portion 31 adapted to rest upon a thrust block 32 which preferably comprises the cutter of the nibbler. As illustrated in Figs. 3 and 4, the thrust block 22 has its lower end cut away to leave a relatively narrow cutting blade 33 which, as the block 22 is reciprocated horizontally, will move up and down relative to a die 34 which is secured to the housing section 12b as by means of a screw or cross pin 35 extending transversely through the housing section 12b. Also it will be observed that the cutter block 32 is preferably cut away as indicated at 36 while the die block is also cut away as indicated at 37 to provide a space accommodating a spring 39 which normally urges the cutter 33 upwardly relative to the die block 34.

The die block 34 is preferably L-shaped, as viewed in Figs. 3 and 4, and has a vertical bore 40 of approximately the same shape and the same size as the cutter 33 formed therethrough so that when the crank arm 25 is urged toward the left as viewed in Figs. 3 and 4, the cutter 33 will penetrate into the bore 40.

Referring particularly to Figs. 3, 4, 5 and 8, the lower leg of the L formed by the die block 34 is spaced downwardly from the housing section 12b by a distance sufficient to permit the admission therebetween of a sheet of metal or other material to be nibbled or cut by the nibbler while, as viewed in Fig. 5, the width of the vertical leg of the die block 34 is substantially equal to the width of the cutter 33 so that upon each stroke of the cutter 33 the section of metal which will be removed from the sheet of metal to be nibbled or cut thereby will have a width substantially equal to the width of the neck or vertical section of the L-shaped die block, thus permitting the sheet of metal to be advanced to such position as to place an uncut section of the sheet of metal against the front face of the neck of the die block 34.

With the construction thus far described it will be apparent that rotation of the shaft 13 will, by rotating the cam 21, cause the crank arm 25 to be oscillated about its pivot 30 and to cause the cutter 33 to be moved first downwardly to make a cut and then upwardly to allow the sheet of metal to be advanced against the neck of the die block 34. The cut or chip which has been taken out of the sheet of metal passes down through the bore 40.

Upon the lower end of the housing 12 I prefer to provide a guide 41 for the purpose of limiting the thickness of metal of the sheet which can be employed with my nibbler attachment, the guide 41 being constructed as a substantially U-shaped block of metal secured as by means of a screw 42 to the lower end of the housing section 12a, the forward portion of the U-shaped guide block being held in alignment with the cutter and die block by means of a finger 43 adjustably mounted as by means of a screw 44 upon the front face of the housing section 12b. The finger 43 has its lower end formed to substantially fit between the legs of the U and thus hold the U from any transverse movement relative to the die block and cutter. By making the finger 43 adjustable vertically relative to the housing section 12b, it will be apparent that movement of the finger 43 downwardly relative to the housing 12b will constitute a further limit to the distance between the die block 34 and the cutter 33, thus further limiting the thickness of metal which may be cut by the nibbler attachment herein described.

This adjustment is readily made by providing an elongated slotted opening 45 in the finger 43 through which the screw 44 extends so that by loosening this screw and moving the finger 43 downwardly the space may be limited to substantially the thickness of the particular piece of metal to be cut and permit substantially no vertical movement of the metal to be cut as the nibbler operates to perform its nibbling or cutting operation.

As is well known in the art of nibblers, the cutter 43, after it has made a cut and is retracted from the piece of metal to be cut, tends to drag the sheet of metal with it so that it is necessary for the operator to provide a substantial downward pressure during the upward movement of the cutter. By properly adjusting the finger 43 to the proper width to conform with the sheet of metal to be cut, the necessity of such downward pressure is avoided and the sheet of metal may be more readily guided by the operator into the cutter with all of the attention of the operator concentrated upon directing the sheet of metal toward the cutter along the desired line of cut.

While the cam 21 may have any desired configuration, I have illustrated in Fig. 7 a preferred cross section of the cam as being substantially cylindrical but having a cut away portion at its center having a length longitudinally of the shaft 33 approximately the height of the block 22. The cam portion is formed as the cut away portion with a low point 46 gradually merging into the circle of the cylindrical portion of the cam to a high point 47 and then abruptly dropping back to the low point 46. Thus the rotation of the shaft 13 will cause the cutter 33 to be urged in a gradual manner downwardly toward the die block 34 and then as the block 22 rides off of the high point 47, the spring 28 will snap the block 22 and the crank arm 25 back to its uppermost position.

When the nibbler attachment is in place on the drill press, as illustrated in Fig. 1, the table 10 thereof will be lowered slightly below the lowermost portion of the die block 34 so as to insure ample room for the escape of chips or cuttings which are cut away from the piece of sheet metal.

Figure 9:
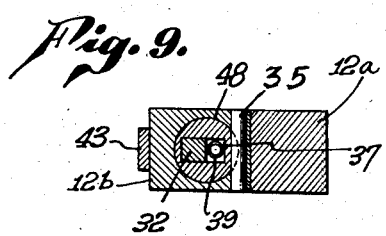
Fig. 9 is a horizontal sectional view taken along the line IX—IX of Fig. 3.
Figure 10:
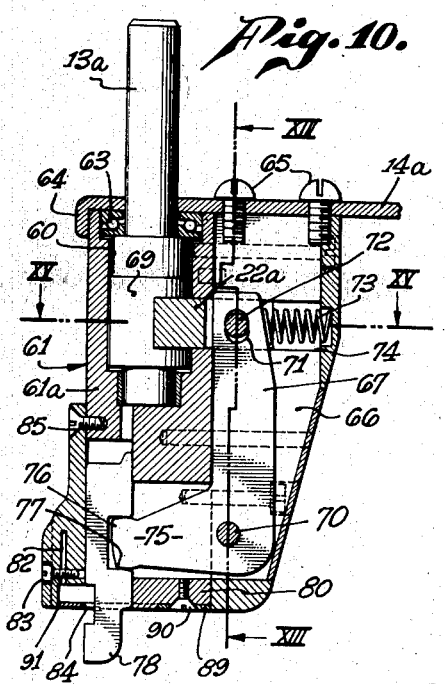
Fig. 10 is a vertical sectional view taken through a modified form of nibbler attachment which may be employed in the practice of my invention and illustrating the position of the parts when the cutter is in its projected position relative to the die.
Figure 11:
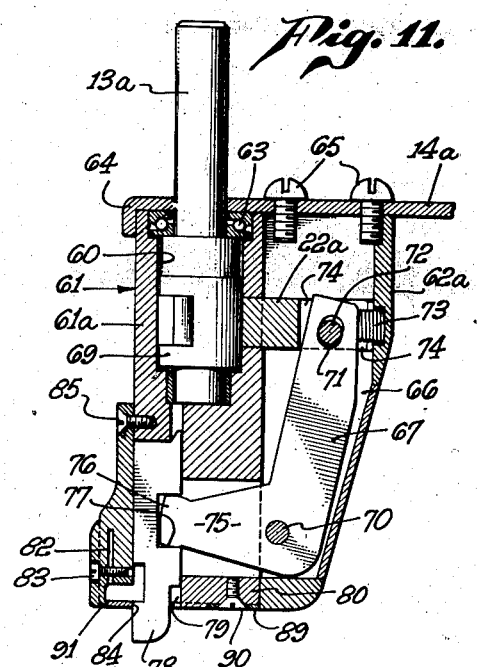
Fig. 11 is a view similar to Fig. 10 and illustrating the position of the parts when the cutter is in its retracted position relative to the die.
Figure 12:
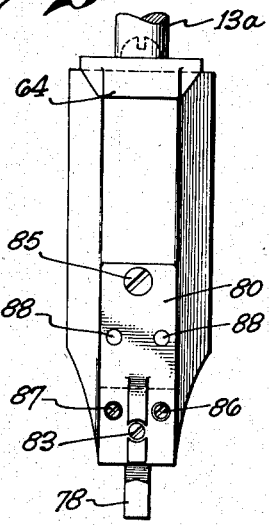
Fig. 12 is a front elevational view of the form of nibbler attachment illustrated in Figs. 10 and 11.
Figure 13:
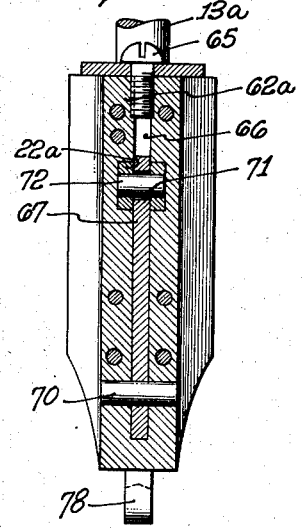
Fig. 13 is a vertical sectional view taken along the line XIII—XIII of Fig. 10.
Figure 14:
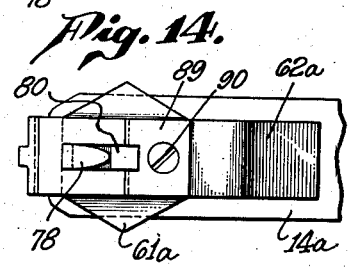
Fig. 14 is a bottom plan view of the nibbler attachment shown in Figs. 10 through 13.
Figure 15:
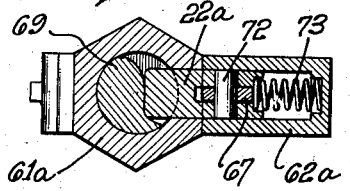
Fig. 15 is a horizontal sectional view taken along the line XV—XV of Fig. 10.

As illustrated particularly in Figs. 2, 4 and 9, the cutter 33 and the die block 34 are formed as a unit which may be of substantially circular cross section and inserted bodily into a circular bore 48 formed in the lower end of the housing member 12, thus facilitating the ready removal of the cutter and die block and the insertion in place thereof of other cutters and die blocks where it is desired to make a wider or a narrower cut in the sheet metal to be cut by the nibbler.

Also it will be observed from an inspection of Figs. 1, 2 and 3 that the housing portions 12a and 12b may be readily assembled together as by means of elongated screws 49 and 50, facilitating the cutting or forming of the necessary openings therein for the reception of the shaft 13 and the crank arm 25. The bar 14 may be secured to the nibbler housing in any suitable fashion though I prefer that the same be secured as by means of a plurality of screws 51 extending through the bar 14 into the housing section 12b while the housing 12a may have a bracket 52 secured thereto as by means of screw 53 which is in turn riveted or otherwise secured as indicated at 54 to the bar 14.

One advantage of the construction illustrated in Figs. 1 through 9 is that the cutter 33 is relatively narrow in its front to back dimension, thus permitting a relatively narrow strip to be cut from the side edge of a piece of sheet metal or other material to be cut thereby as by feeding the same sidewise (front to back as viewed in Figs. 1 through 4). For example, the cutter 33 may have a dimension of approximately $\frac{1}{8}$ of an inch so that if it is desired to trim a very narrow strip from the side edge of a piece of material all that is necessary is to feed the same sidewise between the cutter 33 and the die block 34 and the total extent of the cut which will be made will not exceed the front to back dimension of the cutter 33.

Also it will be observed that the finger 43, by virtue of its up and down adjustment, will act as a presser foot engaging the upper surface of the sheet of material to be cut, avoiding the necessity of utilization of any additional mechanism when very thin metal is to be cut by the nibbler.

Referring particularly to Figs. 10 through 15, I have illustrated a nibbler attachment of the character set forth but with the modification that the cut is made on the up stroke of the cutter rather than upon the down stroke thereof, as in Figs. 1 through 9.

In this form of the device the shaft 13a is mounted in a suitable bore 60 formed in the housing 61 which, like the housing 12, is preferably formed as two separate portions 61a and 62a for convenience in manufacture. The shaft 13a is received within the bore 60 which preferably mounts a combination thrust and roller bearing 63 preferably seated in an enlargement of the bore 60 at the upper end of the housing section 61 and held in place therein by the bar 14a which is substantially in all respects identical with the bar 14 as described with reference to Figs. 1 through 9. The bar 14a extends across the top of the assembled housing sections 61a and 62a and has a downwardly depending lip 64 extending downwardly in front of the housing section 61a. The bar 14a may be secured to the housing 61 in any suitable manner as by means of a plurality of screws 65 which, in view of the fact that it is necessary in the construction of the housing section 62 to mill out a substantially large opening 66 for the reception therein of a crank arm 67, are threaded into bores 68 as indicated in Fig. 3, these bores being but slightly larger in diameter than the width of the milled cut 66 formed in the housing section 62a so as to provide the necessary engagement for the threads of the screw 65.

The bar 14a, like bar 14, extends from the nibbler attachment housing 61 rearwardly and is engaged with the upright post of the drill press in the same manner as was described with reference to Figs. 1 through 9.

However, in this form of the device the cam 69 on the shaft 13a and the push block 22a are arranged in such manner as to provide for an oscillatory motion of the crank arm 67 substantially opposite to that provided for the crank arm 25 illustrated in Figs. 1 through 9. The crank arm 67 is pivoted as indicated at 70 in the housing section 62a, its longer leg being provided with an elongated opening 71, through which a pin 72 passes to interconnect the push bar 22a with the crank arm. A suitable spring 73 is bifurcated as indicated at 74 for the reception of the long arm of the crank arm 67. The short arm 75 of the crank arm 67 has a nose-piece 76 which engages a notch 77 formed in a cutter 78 so that as the crank arm 67 is oscillated about its pivot 70 the cutter 78 will be first drawn upwardly and then downwardly within a vertically extending slot 79 formed in the housing section 61a.

In this form of the device I prefer to make the die block 80 as a piece of metal independent of and as an attachment to the housing member 61a. The die block 80 has an opening 81 extending therethrough, through which the cutter 78 reciprocates. By forming the die block 80 with a vertically extending slot 82 adjacent its forward surface and by providing an adjusting screw 83 extending horizontally through the front face of the die block 80, it will be apparent that the die block 80 may be adjusted to take up for any wear which may occur as a result of the repeated cutting operations of the cutter 78; that is, if the die block wears to the extent that it fails to present a sharp edge to the forward face of the cutter 78, tightening the screw 83 will slightly bend the die block 80, thus drawing the cutting edge 84 close into juxtaposition to the forward face of the cutter 78.

The die block 80 is preferably secured to the front face of the housing section 61a as by means of screws 85, 86 and 87, the heads of the screws 86 being preferably counter-sunk into the front face of the die block 80 past the slot 82 so that they will not interfere with the adjustment to be performed by the screw 83. Also to aid in the proper positioning of the die block 80 on the housing section 61a, I prefer to provide a pair of locating pins 88 formed upon the housing section 61a to be inserted in suitably aligned openings in the front face of the adjustable die block 80.

Located upon the lower face of the die block 80 is a relatively thin strip of metal 89 adapted to be held in place thereon by means of a screw 90, the plate 89 being preferably formed with a narrow opening, the width of which is sufficiently wide to accommodate the left to right dimensions of the cutter 78 while the forward edge of the plate 89 is preferably beveled as indicated at 91 to engage in a suitably beveled edge formed in the adjustable front face of the die block 80. Thus by forming the strip 89 of relatively hard steel a replaceable die block is readily formed which, as the die block wears as a result of the cutting operations, may be moved slightly rearwardly by the adjustment of the screw 83 to bring a substantially fresh surface adjacent the forward surface of the cutter 78, rendering the strip 89 substantially self-sharpening by reason of its contact with the cutter 78 during the cutting operations. For the purpose of permitting this adjustment the opening through which the screw 90 extends is preferably elongated in a front to back relation so that while the head of the screw 90 will hold the same in position it will permit the front to back adjustment as the screw 83 is turned inwardly.

While I have illustrated the nibbler attachments of my invention as being associated with a standard drill press, it will be apparent that they may be readily adapted for attachment to electric power drills or any other machine which has a rotatable spindle to which the shaft 13a may be coupled for rotation so that all that is necessary is to couple the shaft 13 or 13a to the rotatable spindle and to secure the bar 14 or 14a in position relative to some stationary part of the power machine so as to resist the effect of the rotation of the shaft 13 or 13a.

It will be apparent that once the nibbler attachment has been put in place, it may be used as a means for forming cuts of various shapes in pieces of sheet metal fed toward the cutters 33 or 78 or fed sidewise relative to these cutters as hereinbefore described. What is equally important is that when it is not desired to employ the nibbler it may be readily removed from the power machine to which it has been attached and stored in some suitable location, permitting the use of the power machine for other purposes without the necessity of employing floor space which would otherwise be required for a complete nibbler machine.

It will therefore be apparent that I have provided a nibbler attachment which will perform all of the services of a nibbling machine but which may be used only when it is desired to make cuts in sheet material.

While I have shown and described the preferred embodiment of my invention, I do not desire to be limited to any of the details of construction shown and described herein, except as defined in the appended claims.

I claim:

1. In a nibbler attachment for attachment to a power machine having a rotatable spindle, a housing, a rotatable shaft supported in said housing for attachment to the spindle of the power machine and having a cam formed thereon, a bellcrank pivoted in said housing, a push bar reciprocably mounted in said housing for engagement with said cam, means attaching said push bar with one arm of said bellcrank, a nibbler comprising a die block and a cutter reciprocably mounted relative to said die block, one end of said cutter bearing against one arm of said bellcrank for reciprocation thereby as said shaft is rotated, and spring means for urging said push bar against said cam.

2. In a nibbler attachment for attachment to a power machine having a rotatable spindle, a housing, a rotatable shaft supported in said housing for attachment to the spindle of the power machine and having a cam formed thereon, a bellcrank pivoted in said housing, a push bar reciprocably mounted in said housing for engagement with said cam, means attaching said push bar with one arm of said bellcrank, a nibbler comprising a die block and a cutter reciprocably mounted relative to said die block, one end of said cutter bearing against one arm of said bellcrank for reciprocation thereby as said shaft is rotated, spring means for urging said push bar against said cam, and means located on said housing adjacent said die block to define the distance between the die block and said housing to adjust said device for the reception of sheets of material of different thicknesses.

3. In a nibbler attachment for attachment to a power machine having a rotatable spindle, a housing, a rotatable shaft supported in said housing for attachment to the spindle of the power machine and having a cam formed thereon, a bellcrank pivoted in said housing, a push bar reciprocably mounted in said housing for engagement with said cam, means attaching said push bar with one arm of said bellcrank, a nibbler comprising a die block and a cutter reciprocably mounted relative to said die block, one end of said cutter bearing against one arm of said bellcrank for reciprocation thereby as said shaft is rotated, spring means for urging said push bar against said cam, and means for adjusting the die block relative to the cutter to take up for relative wear between the cutter and the die block.

BENJAMIN F. SCHMIDT.